DEFENSIVE PUBLICATION

UNITED STATES PATENT OFFICE

Published at the request of the applicant or owner in accordance with the Notice of Dec. 16, 1969, 869 O.G. 687. abstracts of Defensive Publication applications are identified by distinctly numbered series and are arranged chronologic The heading of each abstract indicates the number of pages of specification, including claims and sheets of drawings conta in the application as originally filed. The files of these applications are available to the public for inspection and reproduc may be purchased for 30 cents a sheet.

Defensive Publication applications have not been examined as to the merits of alleged invention. The Patent Office m no assertion as to the novelty of the disclosed subject matter.

PUBLISHED AUGUST 18, 1970

877 O.G. 490

T877,006

LASER STABILIZATION AND/OR PHOTO-DEVELOPMENT OF SILVER HALIDE MATERIALS

John Carl Marchant, Webster, and John Ridler Tinney, Macedon, N.Y. (both % Kodak Park Division, Rochester, N.Y. 14650)

Filed Jan. 29, 1970, Ser. No. 6,955
Int. Cl. G03c *5/04, 5/32, 5/38*
U.S. Cl. 96—45.2
No Drawing. 7 Pages Specification This disclosure relates to silver halide systems wherein a spot laser beam is used to stabilize an area of a silver halide photographic element. In one aspect, the silver halide system preferably stabilized and/or photodeveloped by this technique contains silver halide grains having polyvalent metal ions occluded therein, preferably trivalent metal ions such as bismuth, iridium and the like, said system further comprising a halogen acceptor, such as a direct-print halogen acceptor, contiguous to the grains. In one preferred embodiment, a high-intensity imagewise exposure is used to record an image on the silver halide layer which can be a laser light source when the emulsion is appropriately sensitized. A defocused laser is then used to heat-stabilize the silver halide in the image exposure areas; a laser of a second wave length is used if the emulsion is laser-sensitized for the first exposure. Subsequent image exposures can then be made on the same photographic element followed by localized image stabilization. In certain instances, low-intensity laser beams or other localized light sources can be used to photodevelop the image in localized areas after stabilization.